Figure 1:
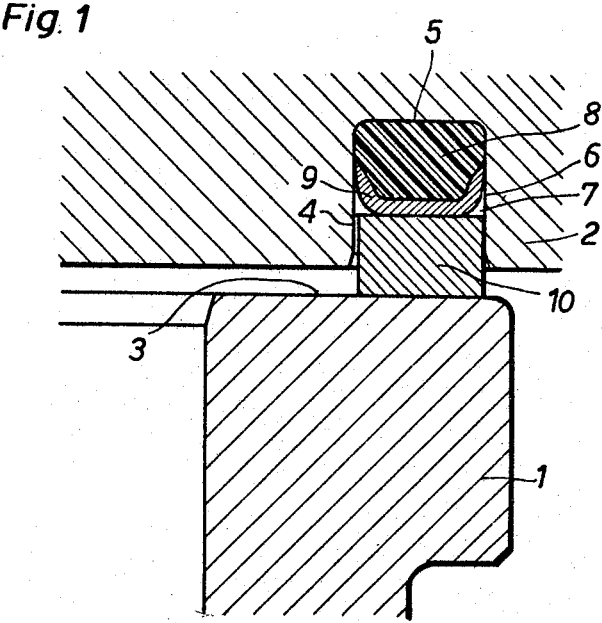

3,330,568
ANNULAR LEAD PACKING FITTED WITH U-SHAPED COVER MEMBER AND THRUST COLLAR FOR CYLINDER HEAD SEAL
Bernhard Wetzel, Arbon, Thurgau, Switzerland, assignor to Adolph Saurer Ltd., Arbon, Switzerland
Filed Feb. 3, 1964, Ser. No. 342,055
Claims priority, application Switzerland, Feb. 5, 1963, 1,365/63
1 Claim. (Cl. 277—198)

This invention relates to internal combustion engines, and more particularly to cylinder head joints of the kind including an annular sealing member disposed in a circular groove, this groove being provided in one of the two portions to be joined.

Numerous types of cylinder head joints have been proposed in the prior art. Yet, the high sealing pressures necessitated by modern heavy duty engines, are known to be apt to cause deformations of the cylinder barrels which are utterly detrimental, and so far no system has been suggested which is securely protected from such deformations.

It is a primary object of the present invention to eliminate this drawback, and to provide a cylinder head joint for internal combustion engines which provide a secure joint for heavy duty engines without incurring the risk of cylinder barrel deformation.

Other objects, and the manner in which the same are attained, will become apparent as this specification proceeds.

In pursuit of its principal objective, the present invention contemplates providing a sealing or packing member made of a plastic material which under the influence of the extraordinarily high contact pressure required in heavy duty engines, is capable of exhibiting plastic flow; providing further a profiled intermediate ring which so embraces the sealing member at least on the open side of the groove that the member is firmly locked in said groove, and providing a thrust collar extending into the groove with slight lateral play and bearing against said intermediate ring.

In a preferred embodiment of the invention, the packing member is made of soft lead. The intermediate ring may be made of sheet metal and may have a U-shaped section to render it effective as a packing ring in the annular groove in which it is placed. The intermediate ring may also be provided in the form of a tubular sheet metal ring with a substantially rectangular section which completely surrounds the packing member. The thrust collar, which extends with slight play into the annular groove provided in one of the two parts to be joined and sealed relative to one another, comprises an annular surface which rests on the other part; alternatively, the thrust collar may be provided in the form of an annular extension of the other part.

In the drawing accompanying this specification and forming part thereof, two embodiments of the invention are illustrated diagrammatically, with illustrative rather than limitative intent.

In the drawing,

FIG. 1 is a diagrammatic showing, in section, of part of a cylinder assembly incorporating one of the packing means according to the invention.

Referring to the drawing wherein like elements are denoted by identical reference numerals, and first to FIG. 1: 1 is a cylinder barrel and 2 a cylinder head which is sealed relative to the front end 3 of the barrel 1. Cylinder head 2 is provided with an annular groove 7 delimited by walls 4, 5 and 6, which accommodates the packing member 8.

An intermediate ring 9, having a U-shaped section and tightly abutting against the walls 4 and 6, embraces partly the packing member 8. A thrust collar 10 extending with little lateral play into the groove 7, rests on the front end 3 of cylinder barrel 1, and bears down on the intermediate ring 9.

Under the influence of the high sealing pressure, the material of the packing member which consists of a principally plastically deformable material, such as soft lead, which behaves like a liquid.

The invention also contemplates such manifestly analogous arrangements as provision of the annular groove in the cylinder barrel instead of the cylinder head, and provision of a thrust collar resting on the sealing face of the cylinder head, or else being formed as an integral extension of the cylinder head.

Accordingly, I wish it to be understood that I do not desire to be limited to the details of construction, design and function shown and described, as modifications of the invention embraced within the scope of the appended claim and involving no departure from the spirit of the invention nor sacrifice of the advantage thereof, may occur to workers in this field.

I claim:

A cylinder head seal for engagement between the cylinder barrel part and an annular groove provided in the cylinder head part of an internal combustion engine comprising: an annular packing member of generally rectangular cross section which is disposed in said annular groove; said packing member being formed of plastically deformable lead which flows like a liquid under high sealing pressure; a U-shaped intermediate ring embracing the bottom of said packing member on at least the open side of said annular groove; said intermediate ring consisting of sheet metal which is flat along the bottom of said packing member and is profiled along the legs of said U-shaped section to thereby serve as a cover for said packing member which resists compression; and a thrust collar of rectangular cross section fitting in said groove with little lateral play and bearing against said U-shaped intermediate ring to be thereby adapted for pressing and sealing the cylinder head part against the cylinder barrel part.

References Cited

UNITED STATES PATENTS

| 1,678,946 | 7/1928 | Joyce. | |
| 2,561,648 | 7/1951 | Bradley | 277—110 |
| 2,699,349 | 1/1955 | Brownlee | 277—231 |

FOREIGN PATENTS 885,068   12/1961   Great Britain.

SAMUEL ROTHBERG, *Primary Examiner.*